(12) United States Patent
Boutte et al.

(10) Patent No.: US 10,488,632 B2
(45) Date of Patent: Nov. 26, 2019

(54) MEMS LENS ACTUATOR

(71) Applicant: MEMS OPTICAL ZOOM CORPORATION, Layton, UT (US)

(72) Inventors: Ronald W. Boutte, Layton, UT (US); Brandon J. Griffiths, Taylorsville, UT (US)

(73) Assignee: Mems Optical Zoom Corporation, Pinebrook, UT (US)

( * ) Notice: Subject to any disclaimer, the term of this patent is extended or adjusted under 35 U.S.C. 154(b) by 170 days.

(21) Appl. No.: 15/411,206

(22) Filed: Jan. 20, 2017

(65) Prior Publication Data

US 2017/0205603 A1 Jul. 20, 2017

Related U.S. Application Data

(60) Provisional application No. 62/280,933, filed on Jan. 20, 2016.

(51) Int. Cl.
*G02B 13/00* (2006.01)
*G02B 7/08* (2006.01)
*H04N 5/225* (2006.01)

(52) U.S. Cl.
CPC ........... *G02B 13/0085* (2013.01); *G02B 7/08* (2013.01); *H04N 5/2254* (2013.01)

(58) Field of Classification Search
CPC .... G02B 26/00; G02B 26/08; G02B 26/0816; G02B 26/0825; G02B 26/0833; G02B 26/0875; G02B 7/02–16; G02B 13/0085
USPC ................. 359/703, 704, 819–830
See application file for complete search history.

(56) References Cited

U.S. PATENT DOCUMENTS

| | | | | |
|---|---|---|---|---|
| 6,954,311 B2* | 10/2005 | Amanai | ................ | G02B 7/022 353/100 |
| 7,826,153 B2* | 11/2010 | Hong | ................ | G02B 13/001 359/796 |
| 8,054,566 B2* | 11/2011 | Heim | ................ | F04B 43/0054 359/822 |
| 8,358,925 B2 | 1/2013 | Gutierrez et al. | | |
| 8,385,013 B2* | 2/2013 | Hishinuma | ........ | G02B 26/0858 359/819 |
| 8,456,560 B2* | 6/2013 | Singh | ................ | H01L 27/14625 348/335 |
| 8,475,061 B2* | 7/2013 | Linnen | ................ | G02B 3/0018 396/439 |
| 8,521,017 B2* | 8/2013 | Calvet | ................ | G02B 7/003 310/309 |
| 8,649,111 B2* | 2/2014 | Yano | ................ | G02B 13/0085 359/599 |
| 8,711,495 B2* | 4/2014 | Topliss | ................ | G02B 7/08 359/298 |
| 8,786,967 B2 | 7/2014 | Wang et al. | | |
| 2004/0212719 A1* | 10/2004 | Ikeda | ................ | H04N 5/2254 348/340 |
| 2008/0136956 A1* | 6/2008 | Morris | ............. | H01L 27/14618 348/340 |

(Continued)

FOREIGN PATENT DOCUMENTS

WO WO2013063097 A1 5/2013
WO WO2014092212 A1 6/2014

*Primary Examiner* — Nicholas R. Pasko
(74) *Attorney, Agent, or Firm* — Kunzler Bean & Adamson

(57) ABSTRACT

Disclosed embodiments include a MEMS lens system comprising a first lens holder comprising a first lens, an aperture layer comprising an aperture, a lens actuator system, and an image sensor.

9 Claims, 7 Drawing Sheets

(56) References Cited

U.S. PATENT DOCUMENTS

| | | | | |
|---|---|---|---|---|
| 2009/0015706 | A1* | 1/2009 | Singh | G03B 17/00 |
| | | | | 348/340 |
| 2009/0213262 | A1* | 8/2009 | Singh | G02B 7/021 |
| | | | | 348/340 |
| 2014/0354856 | A1 | 12/2014 | Zhou et al. | |
| 2018/0259749 | A1* | 9/2018 | Moriya | B29D 11/00298 |
| 2018/0270404 | A1* | 9/2018 | Ishida | G02B 3/0062 |

* cited by examiner

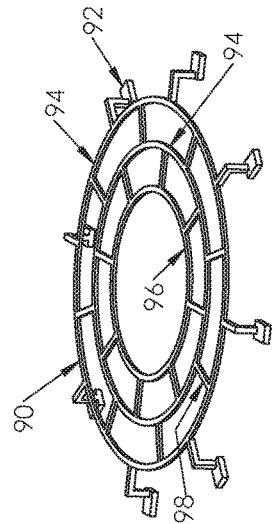
FIG. 4C
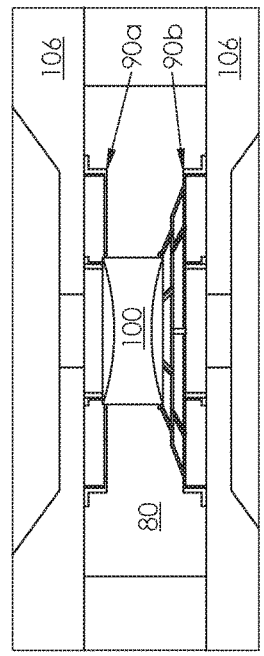
FIG. 4D
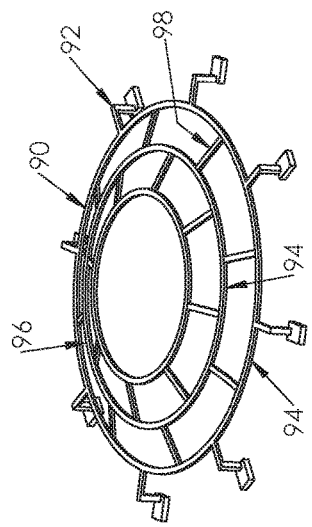
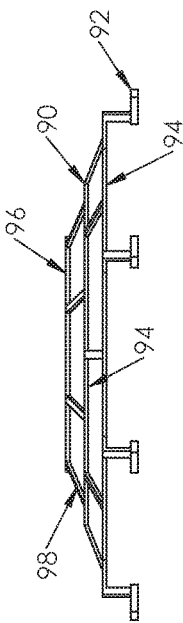
FIG. 4A
FIG. 4B
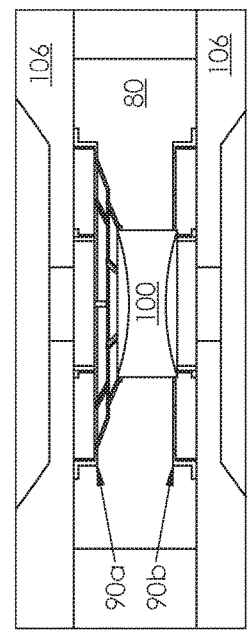
FIG. 4E

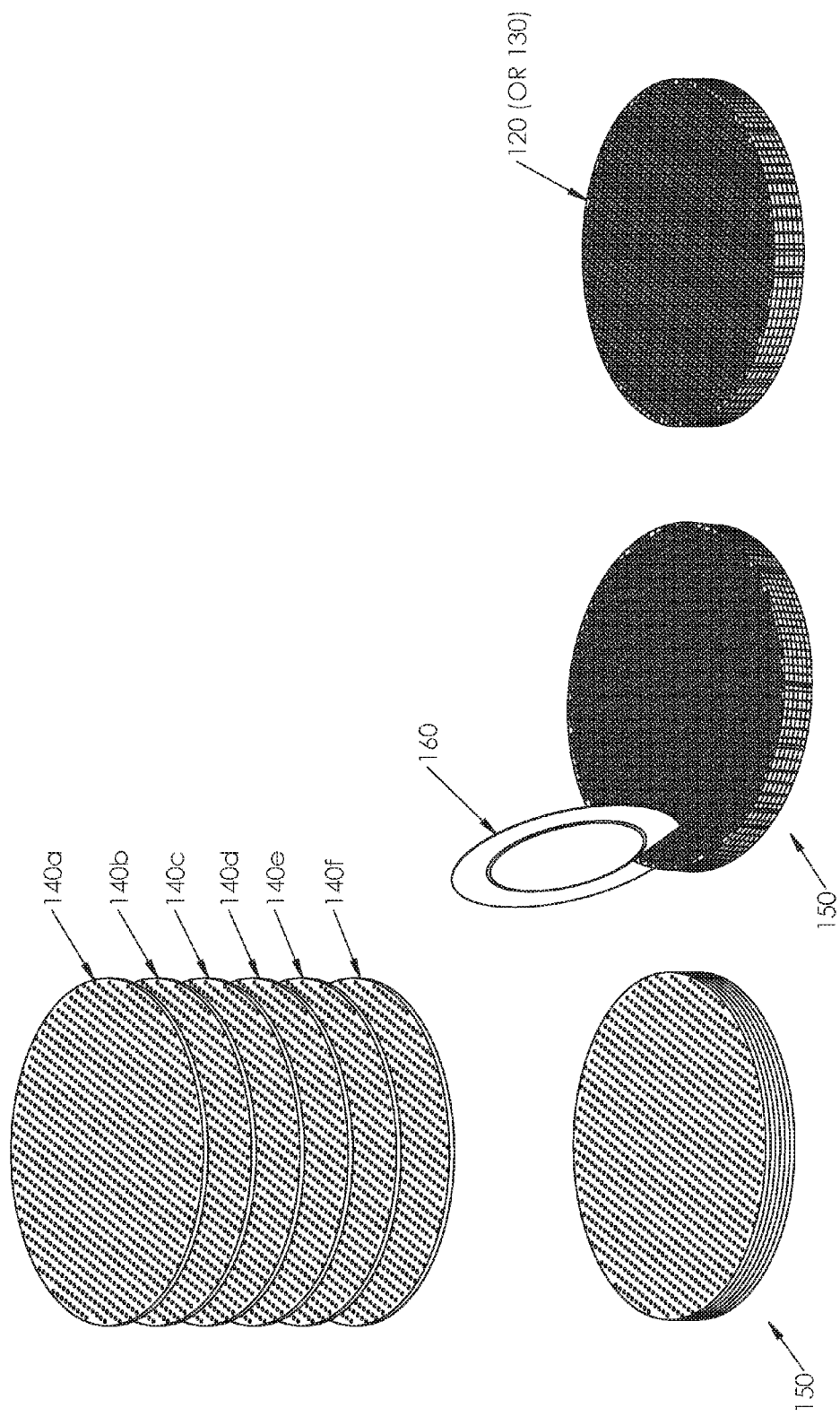

MEMS LENS ACTUATOR

CROSS REFERENCE TO RELATED APPLICATIONS

This application claims priority under 35 USC § 119 to U.S. Provisional Patent Ser. No. 62/280,933, filed on Jan. 20, 2016, and titled "MEMS Lens Actuator" the entire contents of which are hereby incorporated by reference.

FIELD OF THE DISCLOSURE

This disclosure relates generally to micro-electromechanical systems (MEMS) usable in optical devices. In particular, the disclosure relates to a MEMS lens actuator usable on relatively small lenses such as a 3 mm diameter lens.

BACKGROUND

Digital imagers (e.g., cameras) are increasingly being incorporated into consumer devices, such as cellular telephones (e.g., "smartphones"), tablet devices, and the like. As their use increases, there is a related demand for the imagers to deliver a wider range of performance abilities. For example, consumers expect a smartphone camera to be able to change the angle of view (i.e., "zoom," "telephoto," or "wide-angle" focus), to auto-focus, and the like. However, given the relatively small form factor for many of these consumer devices, it is sometimes difficult to incorporate the movable lens systems that would enable higher quality optical abilities. Typically, smartphone cameras, and the like, use software routines to mimic zoom or wide-angle focus abilities, but they usually deliver lesser quality images.

Other MEMS lens systems exist, but usually require relatively complicated lenses, or do not provide the range of movement desirable for small lens (e.g., ~3 mm lenses) systems. Other drawbacks and disadvantages of current systems also exist. Accordingly, there is a need for a MEMS actuator for relatively small lens systems that is suitable for use in consumer devices such as smartphones or the like.

SUMMARY

Disclosed embodiments of a MEMS lens actuator address the above-mentioned, and other, drawbacks and disadvantages of existing systems. Disclosed embodiments include a MEMS lens system comprising a first lens holder comprising a first lens, an aperture layer comprising an aperture, a lens actuator system, and an image sensor.

In further disclosed embodiments the first lens holder further comprises a thermal actuator ring around the first lens and the lens actuator system further comprises at least one lens actuator connected to a second lens. In still further embodiments, the lens actuator is selectively moveable and changes the position of the second lens. In still further embodiments, the lens actuator is selectively movable by the application of a voltage. In further embodiments, the first lens comprises a 3 mm lens and the second lens comprises a diverging lens.

Another disclosed embodiment is a MEMS lens system comprising a first lens holder comprising a first lens, a first aperture layer comprising an aperture, a lens actuator system, a second aperture layer comprising an aperture, a second lens holder comprising a second lens, and an image sensor. In further disclosed embodiments, the lens actuator system further comprises at least one lens actuator connected to a third lens.

In still further disclosed embodiments, the lens actuator is selectively moveable and changes the position of the third lens. In further disclosed embodiments, the lens actuator is selectively movable by the application of a voltage. In further disclosed embodiments, the first lens comprises a 3 mm lens, the second lens comprises a 3 mm lens, and the third lens comprises a diverging lens.

Also disclosed is a method of manufacturing a MEMS lens system comprising creating a first wafer comprising a plurality of first lens holder areas comprising a first lens, creating a second wafer comprising a plurality of aperture layer areas comprising an aperture, creating a third wafer comprising a plurality of lens actuator system areas, and creating a fourth wafer comprising a plurality of image sensor areas. In further disclosed embodiments, the method further comprises coupling the first, second, third, and fourth wafers into a wafer stack and cutting the wafer stack into segments. In some embodiments, each segment comprises a lens system further comprising a first lens holder comprising a first lens, an aperture layer comprising an aperture, a lens actuator system, and an image sensor.

BRIEF DESCRIPTION OF THE DRAWINGS

FIGS. 4A-4E are various views of lens actuator 90 in various positions and in accordance with disclosed embodiments.

FIG. 8 is a schematic illustration of a method for batch producing zoom lens systems 120 in accordance with disclosed embodiments.

Figure 1A:
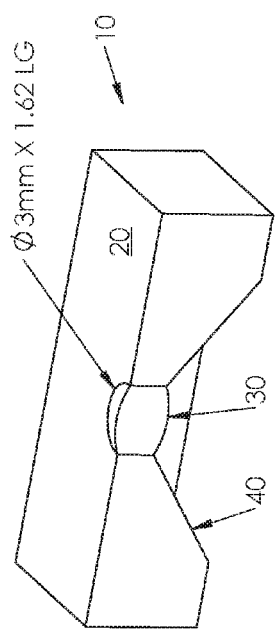
FIGS. 1A-1D are various views of components of a lens system 10 in accordance with embodiments of the disclosure.

While the disclosure is susceptible to various modifications and alternative forms, specific embodiments have been shown by way of example in the drawings and will be described in detail herein. However, it should be understood that the disclosure is not intended to be limited to the particular forms disclosed. Rather, the intention is to cover all modifications, equivalents and alternatives falling within the spirit and scope of the invention as defined by the appended claims.

DETAILED DESCRIPTION

The various embodiments disclosed herein may be achieved using any suitable MEMS technique. For example, deposition of material layers, photolithography, etching, and the like may be implemented using a variety of materials, such as silicon, metals, ceramics, and polymers in order to implement the embodiments disclosed herein.

Figure 1B:
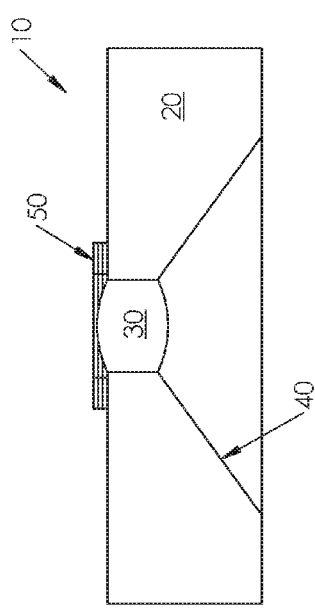
Figure 1C:
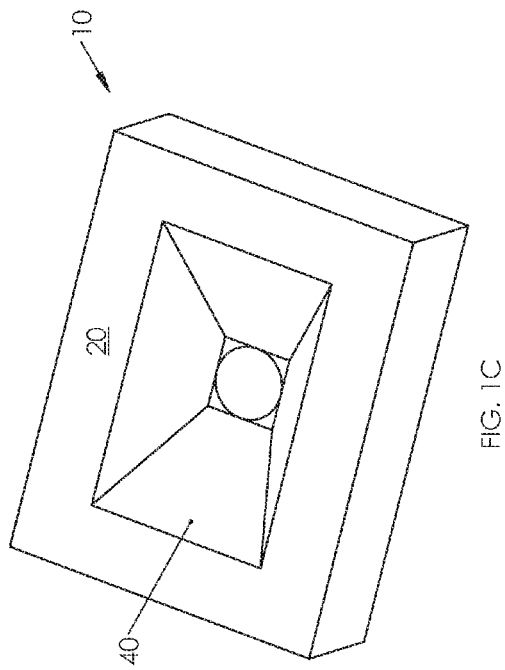

FIGS. 1A-1D are various views of components of a lens system 10 in accordance with embodiments of the disclosure. As shown in FIG. 1A a suitable substrate (e.g., silicon) may be etched, or otherwise manufactured, into a lens holder 20. Lens holder 20 may be fashioned with appropriate openings to hold a lens 30. For example, lens 30 may be a 3 mm diameter lens with an edge length of 1.62 mm. Other size and diameter lenses are also possible. Lens holder 20 may also be fashioned with a suitable aperture 40. As shown in FIG. 1C, aperture 40 may be generally rectangular in cross-section, however, other shapes may also be implemented. As shown in FIG. 1B, embodiments of lens holder 20 may also include a thermal actuator ring 50 which may comprise one or more layers. In some embodiments, application of a voltage to thermal actuator ring 50 causes movement of the ring 50 in an axial direction which enables fine positioning of lens 30.

Figure 1D:
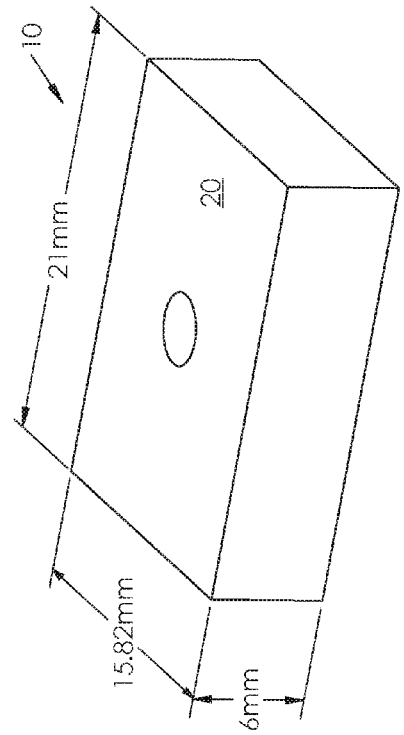

Embodiments of lens holder 20 may be of any appropriate size. For example, as illustrated in FIG. 1D, embodiments of lens holder 20 may be approximately 21 mm long, 15.82 mm wide, and 6 mm thick. Other sizes may also be implemented.

FIGS. 2A-2D are various views of a lens system 10 coupled with an image sensor 60 in accordance with disclosed embodiments. Coupling may be accomplished by any suitable wafer-wafer bonding technique. For example, direct bonding, plasma activated bonding, anodic bonding, eutectic bonding, glass frit bonding, adhesive bonding, thermocompression bonding, reactive bonding, transient liquid phase diffusion bonding, or the like may be used.

As shown, image sensor 60 may comprise a MEMS component that includes a sensor 70 to receive and process images delivered by lens system 10. Sensor 70 may be any suitable sensor, such as a semiconductor charge-coupled device (CCD), or active pixel sensor in complementary metal-oxide-semiconductor (CMOS), or N-type metal-oxide-semiconductor (NMOS, Live MOS) technology. In some embodiments, such as those where the lens actuator system is a component of a smartphone or similar device, the sensor 70 may be sized approximately 4.54 mm×3.42 mm, and may have a sensor area of 0.15 $cm^2$, and a crop factor of 7.61. Other sensors 70 are also possible.

Figure 2A:
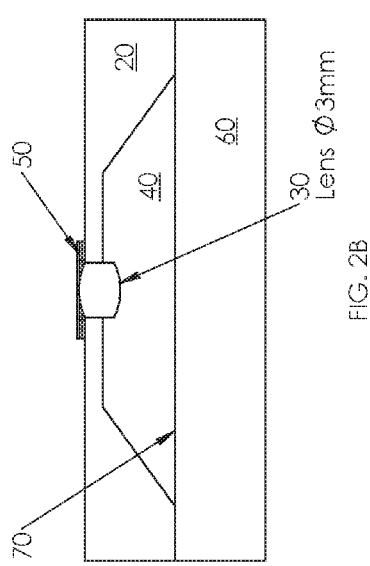
FIGS. 2A-2D are various views of a lens system 10 coupled with an image sensor 60 in accordance with disclosed embodiments.
Figure 2B:
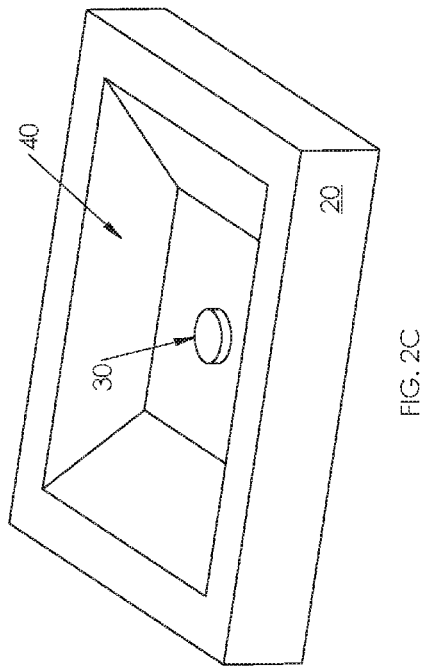
Figure 2C:
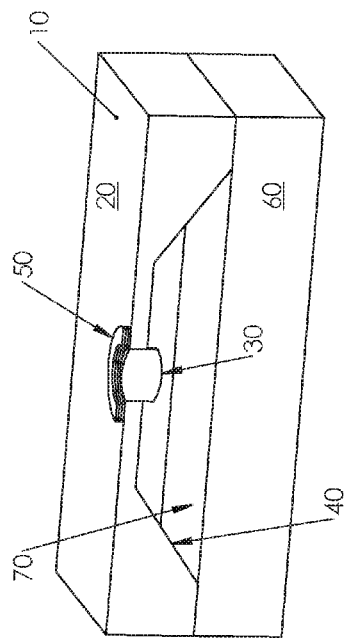
Figure 2D:
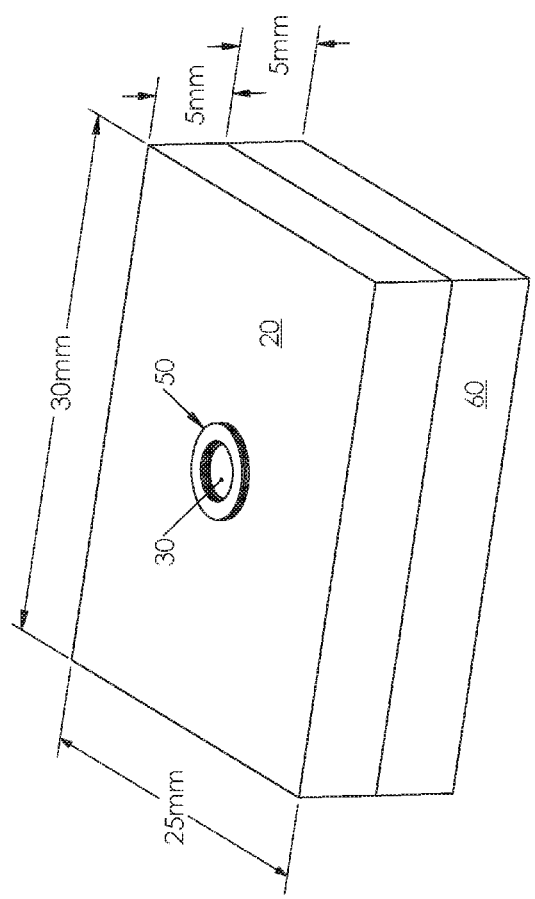

As shown in FIGS. 2A, 2B, and 2D lens system 10 is fashioned generally "above" image sensor 60 so that light from the object being imaged will focus, via lens 30, on sensor 70. In some embodiments, lens holder 20 and image sensor 60 are fashioned approximately 25 mm wide by 30 mm long and 5 mm thick. Other dimensions may also be used.

Figure 3B:
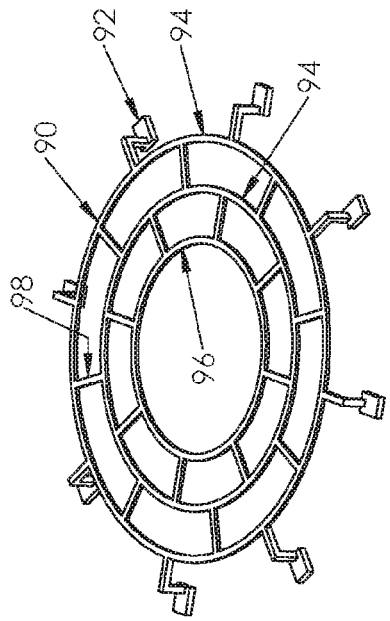
FIGS. 3A-3C are various views of a lens actuator system 80 in accordance with disclosed embodiments.
Figure 3A:
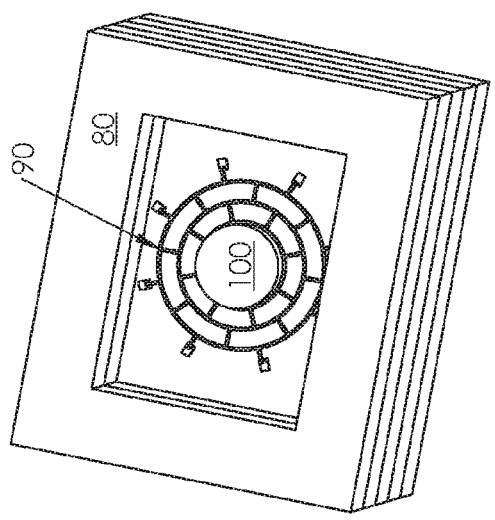
Figure 3C:
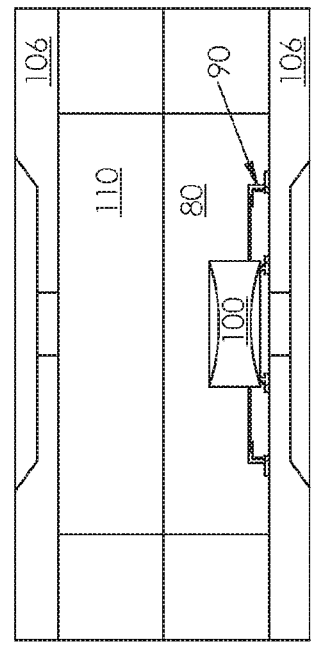

FIGS. 3A-3C are various views of a lens actuator system 80 in accordance with disclosed embodiments. As shown, lens actuator system 80 may comprise a MEMS component fabricated to include a lens actuator 90 and diverging lens 100. In some embodiments, lens actuator system 80 acts in cooperation with lens system 10 to create a telephoto or zoom lens system capable of enlarging or magnifying portions of the image to be captured. Of course, other combinations of lens systems 10 and lens actuator systems 80 may be combined to create other imaging effects such as wide-angle focus, or the like.

Lens actuator 90 may be fabricated from a piezoelectric material and is chosen to move in response to an applied voltage. FIG. 3B shows one embodiment of a lens actuator 90. As shown, the lens actuator 90 may comprise one or more legs 92, one or more outer rings 94, a lens support ring 96, and one or more struts 98. In some embodiments, legs 92 may also serve as contact points for applying a voltage.

Further, while outer rings 94 and lens support ring 96 are shown as generally circular, they need not be and other shapes may be used.

As shown for the embodiment in FIG. 3C, diverging lens 100 may be secured within lens support ring 96 and positioned within a stack of other layers. For example, one or more aperture layers 106 and spacer layers 110 may be employed to position lens actuator system 80 at a desired location. As discussed above, coupling of lens actuator system 80 with one or more of the aperture layer 106 or spacer layer 110 may be accomplished by any suitable wafer bonding method.

FIGS. 4A-4E are various views of lens actuator 90 in various positions and in accordance with disclosed embodiments. As shown in FIGS. 4A-C, when voltage is applied to actuator 90 (e.g., by appropriate electrical connections to legs 92) actuator will flex, or extend as depicted (e.g., FIGS. 4A and 4B). Reduction of the voltage causes the actuator 90 to return to its "rest" shape (e.g., FIG. 4C). In this fashion, selective application of a voltage will enable positioning of a lens (e.g., diverging lens 100) as desired.

FIGS. 4D-4E show an embodiment employing multiple actuators 90a, 90b. In such embodiments, selective application of voltage to one or more of the actuators 90a, 90b may be used to enable additional control over positioning of lens (e.g., diverging lens 100) as desired.

Figure 5B:
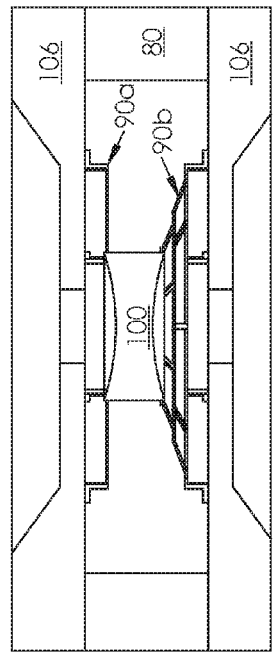
FIGS. 5A-5B show a telephoto or zoom lens system 120 in accordance with disclosed embodiments.
Figure 5A:
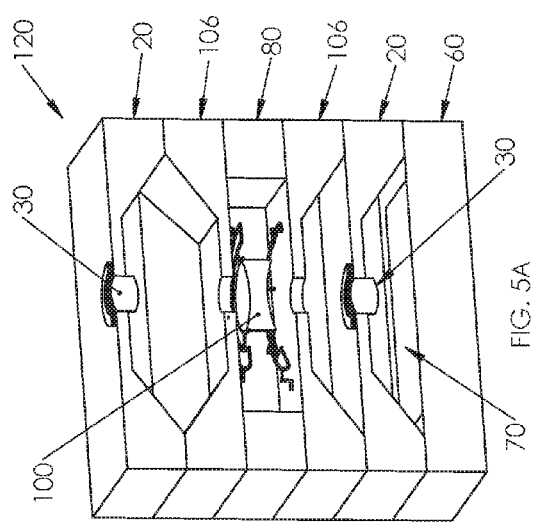

FIGS. 5A-5B show a telephoto or zoom lens system 120 in accordance with disclosed embodiments. As shown, a zoom lens system 120 may be constructed using wafer boding techniques (as discussed above) to assemble the appropriate optical components. As also noted herein, other systems may be constructed for other focusing properties or functions. As shown a first lens holder 20 may be coupled to an aperture layer 106, a lens actuator system 80, another aperture layer 106, a second lens holder 20, and finally an image sensor layer 60. In such a manner, a relatively small and controllable zoom lens system 120 may be assemble for use in smaller imaging devices such as smartphones, tablets, or the like. FIG. 5B is an exploded view of the lens actuator system 80 showing that, for some embodiments, two lens actuators 90a, 90b may be employed. Other configurations are also possible.

Figure 6:
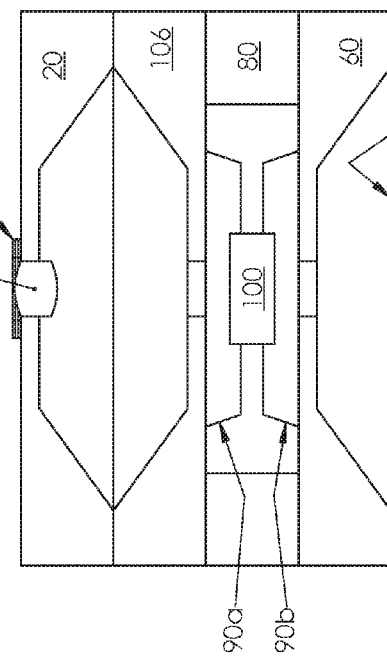
FIG. 6 shows a two-lens zoom lens system 130 in accordance with disclosed embodiments.

FIG. 6 shows a two-lens zoom lens system 130 in accordance with disclosed embodiments. As shown, and as discussed above, a lens holder 20 may be coupled with one or more aperture layers 106 and, optionally, one or more spacer layers 110 (not shown), a lens actuator system 80 comprising one or more lens actuators (e.g., 90a, 90b), and an image sensor 60 comprising sensor 70.

Figure 7B:
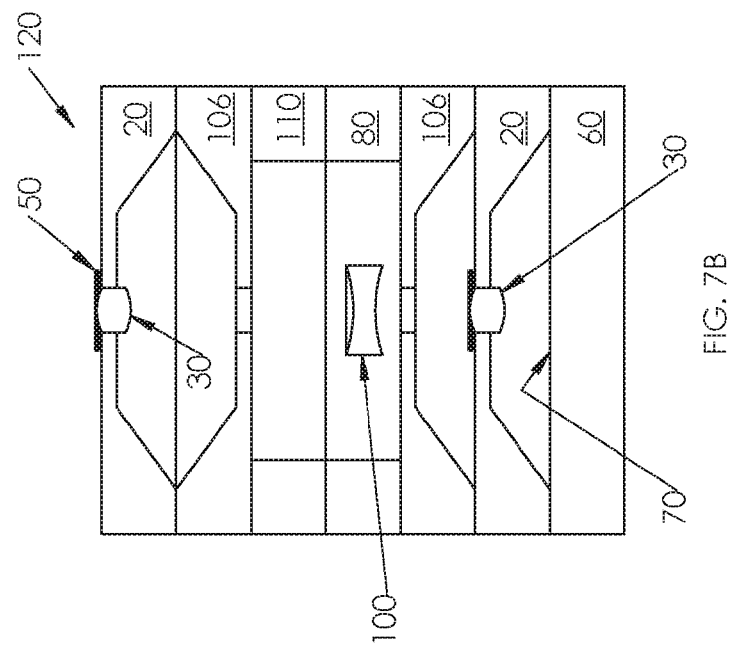
FIGS. 7A-7B are various views of an embodiment of a zoom lens system 120 in accordance with disclosed embodiments.
Figure 7A:
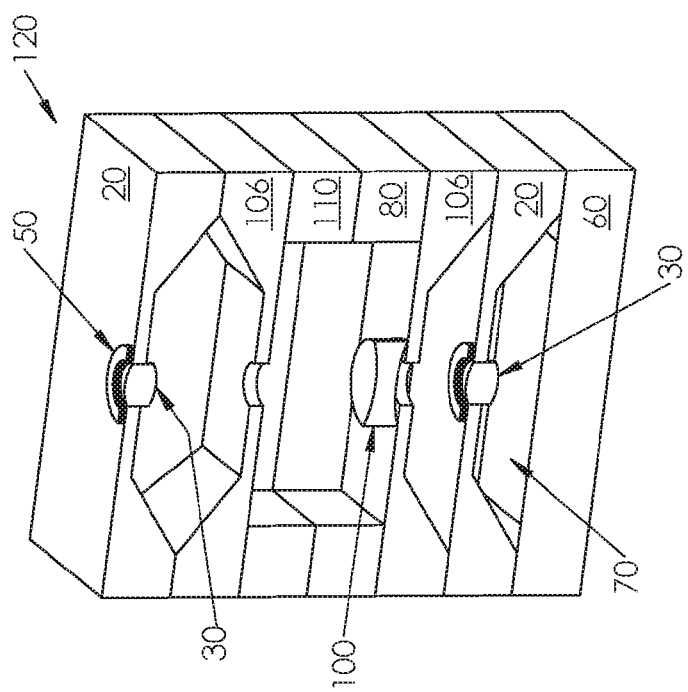

FIGS. 7A-7B are various views of an embodiment of a zoom lens system 120 in accordance with disclosed embodiments. As shown, any suitable number of spacer layers 110 and aperture layers 106 may be implemented to position lens actuator system 80, comprising diverging lens 110 (lens actuator 90 omitted for clarity), at the appropriate position within zoom lens system 120. Factors that may be helpful in deciding the appropriate position of lens actuator system 80 include, but are not limited to, the form factor into which the zoom lens system 120 is to be incorporated, the focal lengths desired, the size and type of lenses used (e.g., 30 and 100), and the like.

FIG. 8 is a schematic illustration of a method for batch producing zoom lens systems 120 in accordance with disclosed embodiments. As shown, one or more wafers 140a-140f may be used to manufacture via known MEMS techniques a plurality of areas containing the appropriate structures (e.g., 20, 60, 80, 106, 110, 90, etc.) for a zoom lens system (120 or 130). In some embodiments, each wafer 140*a*-140*f*, respectively, may contain a plurality of the same structure. For example, wafer 140*a* may comprise a plurality of areas machined with MEMS techniques to contain a number of lens holders 20, wafer 140*b*, may comprise a plurality of aperture layer 106 areas, wafer 140*c* may comprise a plurality of lens actuator system 80 areas, wafer 140*d* may comprise a plurality of aperture layer 106 areas, wafer 140*e* may comprise a plurality of lens holder 20 areas, and wafer 140*f* may comprise a plurality of image sensor 60 areas. Wafers 104*a*-140*f* may then be aligned and coupled to form a wafer stack 150. Wafer stack 150 may then be cut into sections using an appropriate saw blade 160, each section comprising a complete zoom lens system 120 or 130. Other manufacturing techniques may also be used.

Although various embodiments have been shown and described, the present disclosure is not so limited and will be understood to include all such modifications and variations are would be apparent to one skilled in the art.

What is claimed is:

1. A method comprising:
   providing a first substrate comprising a plurality of lens holders, each lens holder of the plurality of lens holders having a corresponding first lens connected thereto;
   providing a second substrate comprising a plurality of apertures corresponding to the plurality of lens holders;
   providing a third substrate comprising a plurality of lens connection areas corresponding to the plurality of apertures, each lens connection area of the plurality of lens connection areas having a corresponding second lens connected thereto;
   coupling the first, second, and third substrate together such that each aperture of the plurality of apertures aligns with, and is disposed between, the corresponding first lens and the corresponding second lens to provide a plurality of separable MEMS lenses;
   wherein the corresponding second lens is connected to the lens connection area via a first actuator and the first actuator comprises a plurality of interconnected concentric rings that are co-planar when the first actuator is in a resting state;
   wherein the first actuator further comprises a plurality of legs that vertically displace the plurality of interconnected concentric rings from the lens connection area and provide a set of contact points for applying a voltage to the first actuator;
   wherein applying a voltage to the set of contact points causes vertical displacement of an inner ring of the plurality of interconnected concentric rings relative to an outer ring of the plurality of interconnected concentric rings; and
   separating the plurality of separable MEMS lenses to provide the plurality of MEMS lenses.

2. The method of claim 1, further comprising conducting at least one substrate alignment process in conjunction with coupling the first, second, and third substrate together.

3. The method of claim 1, wherein the first actuator comprises a piezoelectric material.

4. The method of claim 1, wherein the first actuator encompasses the second lens when viewed from above.

5. The method of claim 1, wherein the plurality of interconnected concentric rings encompass the second lens when viewed from above.

6. The method of claim 1, wherein the corresponding second lens is connected to a second actuator.

7. The method of claim 6, wherein the second actuator is also connected to the second substrate.

8. The method of claim 6, wherein the second actuator comprises a ring-shaped layer that encompasses the second lens.

9. The method of claim 6, wherein the second actuator comprises a plurality of interconnected concentric rings that are co-planar when the second actuator is in a resting state.

* * * * *